March 13, 1934. H. GORANSON ET AL 1,950,791
FLOWER END CUTTER FOR FRUIT PEELING MACHINES
Original Filed May 29, 1929
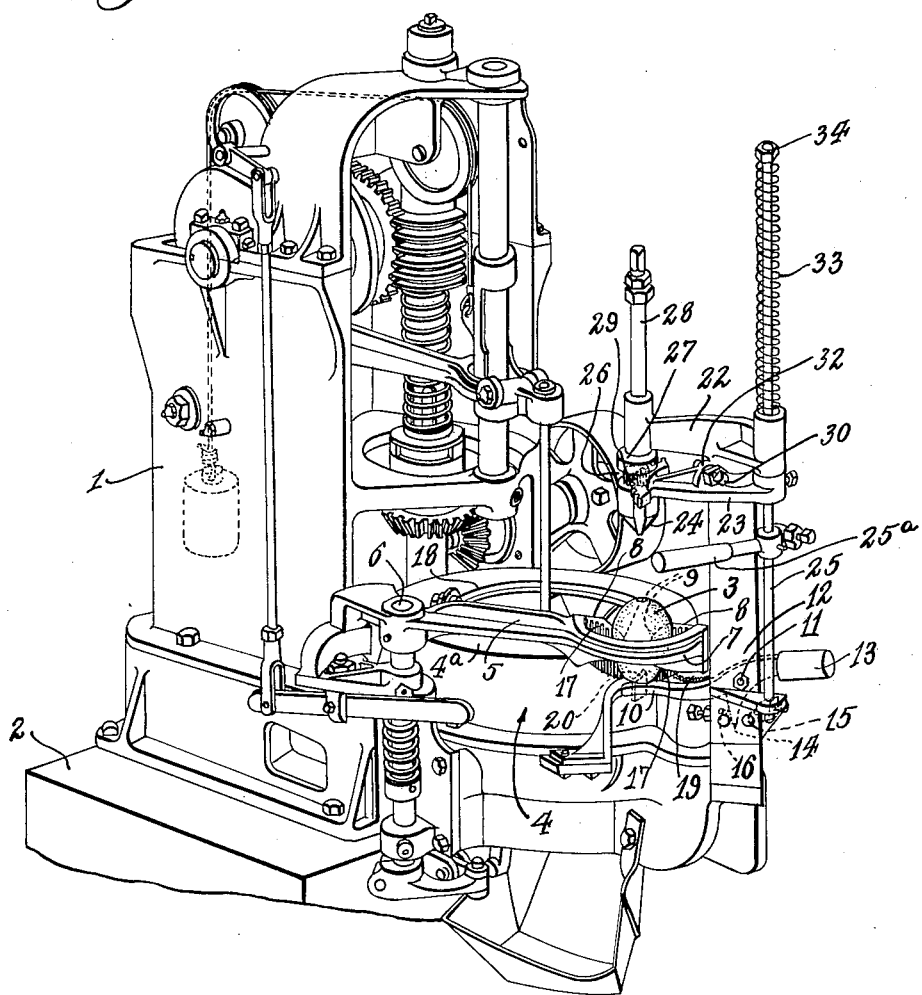
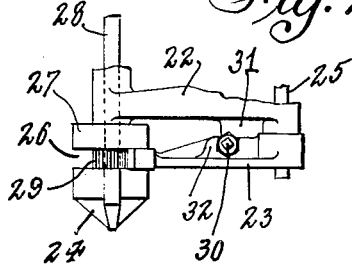
Inventors
Hjalmar Goranson
David Goranson
By Lyon & Lyon
Attorneys Patented Mar. 13, 1934

1,950,791

UNITED STATES PATENT OFFICE 1,950,791

FLOWER END CUTTER FOR FRUIT PEELING MACHINES

Hjalmar Goranson and David Goranson, Sunnyvale, Calif., assignors to California Packing Corporation, San Francisco, Calif., a corporation of California Original application May 29, 1929, Serial No. 366,790. Divided and this application June 1, 1931, Serial No. 541,190

7 Claims. (Cl. 146—52)

This invention relates to apparatus to be used for cutting out or gouging the flower end of fruit. In the following specification, it is described as an accessory to a fruit peeling machine, and the present application is a division of our co-pending application, Fruit peeling machine, Serial No. 366,790, filed May 29, 1929. The machine to which we have applied our invention comprises fruit peeling mechanism through which the fruit to be peeled is moved downwardly by a pusher rod or stem.

The general object of the present invention is to provide simple means for receiving and holding the fruit to one side of the peeling mechanism and to provide hand operated means cooperating with the holding means to cut out the flower end. After accomplishing this, the holder for the fruit swings the fruit out into alinement with the pusher stem that carries the fruit thereafter through the peeling mechanism.

One of the objects of the invention is to provide means for supporting and controlling the flower end cutter so that it can be completely controlled by a single operating part or lever; also to construct this mechanism so that the cutter is automatically withdrawn out of the way when not in use.

Further objects of the invention will appear hereinafter.

The invention consists of novel parts and combinations of parts to be described hereinafter, all of which contribute to produce an efficient flower end cutter for fruit peeling machines.

A preferred embodiment of the invention is described in the following specification, while the broad scope of the invention is pointed out in the appended claims.

In the drawing—

Figure 1 is a perspective of a fruit peeling machine to which our invention has been applied; and Figure 2 is a side elevation with certain parts broken away illustrating details of the cutter head and the means for operating it.

The machine to which we have applied our invention comprises a frame 1 in the form of an up-right housing adapted to be supported on a table or bench 2. This housing is open at its front side and its lower portion extends forwardly from the bench so as to enable the machine to be conveniently controlled by an operator. The machine is constructed so that the fruit, for example: a pear 3, is placed in a fruit holder which is capable of assuming a receiving position for the fruit in which it is illustrated in Figure 1. After the fruit is put in position, it is swung inwardly so that its axis will come into alinement with the peeling mechanism enclosed in a circular housing, or cover, 4, after which the machine operates to advance the fruit automatically through the peeling mechanism.

The holder for the fruit is in the form of a swinging frame constructed as an arm 5 attached to a vertical shaft 6 rotatable on a vertical axis and supported in suitable bearings at the side of the machine.

The end of the holder arm 5 is constructed with suitable means for holding the fruit with its axis in an up-right position and so that the fruit cannot rotate. For this purpose, the end of the holder arm is formed into a semi-circular head 7, the opening of which operates as a receiving throat for the fruit.

When the fruit is put in place, it is shoved down by a vertical movement along the axis of this throat so that the fruit is engaged by impaling blades that project into the throat. In the present instance, we prefer to provide two such impaling blades 8 which are diametrically opposite to each other and which project radially inward from opposite sides of the semi-circular head 7.

These impaling blades 8 are in the same vertical plane and are located so that they project toward each other, their inner edges 9 being disposed slightly apart so that they do not extend into the fruit sufficiently to halve it. When the fruit is put in place, its downward movement is limited by a rest 10 in the form of a lever pivotally mounted at 11 on a frame member 12, the tail of this lever being provided with a counter-weight 13. This lever has a downwardly projecting toe 14 that may come against an adjustable stop 15 to limit the downward movement of the rest when shoved down by the fruit, and a similar adjustable stop 16 may be provided to cooperate with the toe 14 to limit the upward movement of this rest. These two stops enable the position of the rest to be nicely adjusted with respect to the impaling blades 8. These impaling blades may be provided with vertical parallel corrugations 17 which have been disclosed in our former application, Serial No. 366,790, filed May 29, 1929, for a Fruit peeling machine, and they operate to assist in guiding the fruit and to increase the holding power of the impaling blades on the fruit.

After the fruit is set in place as illustrated in Figure 1, the swinging frame 5 is swung out over the center of the cover or housing 4 so as to come over the center of a large opening 18 that is formed through the top plate of this cover. As the fruit swings inwardly, its lower end passes across a cutter in the form of a rotary disc 19 which serves the stem end of the fruit. This cutter 19 is more fully illustrated in our co-pending application, Serial No. 366,790, Fruit peeling machine, filed May 29, 1929. It is continuously driven when the machine is in operation.

We provide means for steadying the fruit as it engages this cutter 19. The cutter is in a horizontal position, and is at substantially the same level as the top plate 4a of the housing or cover 4. In order to steady the fruit 3 as it swings toward the center of the opening 18, we provide an arcuate blade 20 which is curved about the axis of the vertical shaft 6 on which the fruit holder 5 swings.

Before the fruit is swung out into the peeling position, we prefer to cut out the flower end of the fruit. For this purpose, we provide a hand operated device which has a cutter which can be advanced to engage the flower end of the fruit and which can be rotated by means of the same lever that advances it. This gouging cutter is preferably mounted in such a way that it can be automatically withdrawn by a spring when its operating handle is released. The preferred construction for this purpose includes a guide frame 22 fixed to the frame of the machine and having means for guiding a carriage, which is a cross-head preferably in the form of a segment which, when it descends, carries down with it the gouging cutter 24. For this purpose, the segment 23 is rigidly secured to a vertical slide bar 25 that is guided to slide through one end of the guide frame 22. The arc of the segment or cross-head 23 runs in a circumferential groove 26 of a collar 27 on the lower end of a sliding spindle 28 that is also guided to slide vertically through the guide frame 22 and located at the other end of the guide frame. The slide bar 25 carries a rigid operating lever 25a. The gouging tool 24 is substantially in line with the axis of the pear 3 when the pear is placed in the holder in the receiving position. The slide bar 25 is normally held in an elevated position by means of a coil spring 33 disposed around its upper end, thrusting against a nut 34 on the upper end of the slide bar and supported on the upper side of the guide frame 22.

By seizing the lever 26, and moving it laterally with respect to its pivotal connection and along the guiding direction, the operator can slide the spindle 28 down till the gouging cutter 24 engages the pear. Thereafter slight swinging movement of the lever 26 on its pivotal axis will rotate the slide bar 25 on its axis and impart rotary movement to the spindle 28 that carries a pinion 29 meshing with the teeth of the segment 23. This will gouge the upper end of the pear. When the operator releases the lever 25a, the spring 27 will withdraw the cross-head 23 from the vicinity of the fruit, carrying with it, the gouging cutter 24.

Means is provided associated with the segment 23 for limiting its movement to prevent its teeth from coming out of mesh with the pinion 29. For this purpose, the cross-head or segment is provided with two stop screws 30 (see Figure 2) which illustrates one of them. These screws are mounted on opposite sides of a lug 31 that projects down from the under side of the guide frame 22. These stop screws are mounted respectively in lugs such as the lug 32 (see Figure 2), which project upwardly from the segment, one of these lugs being located on each side of the stop lug 31.

It is understood that the embodiment of the invention described herein is only one of the many embodiments this invention may take, and we do not wish to be limited in the practice of the invention, to the particular embodiment set forth.

What we claim is:

1. In a machine of the kind described, the combination of a frame, means for supporting the fruit in a substantially fixed position with the flower end uppermost, a carriage in the form of a cross-head located above the fruit, with means for guiding the same to move toward the fruit, a rotary cutter carried by the cross-head in line with the flower end of the fruit, and a handle for depressing the cross-head to bring the rotary cutter into engagement with the flower end of the fruit, said cross-head being in the form of a segment pivotally mounted to swing in a plane substantially at right angles to the guiding direction, and affording means for connecting the handle with the rotary cutter to rotate the cutter when in engagement with the fruit.

2. In a machine of the kind described, the combination of a frame, means for supporting the fruit in a substantially fixed position with the flower end uppermost, a carriage in the form of a cross-head located above the fruit, with means for guiding the same to move toward the fruit, a rotary cutter carried by the cross-head in line with the flower end of the fruit, a handle for depressing the cross-head to bring the rotary cutter into engagement with the flower end of the fruit, said cross-head being in the form of a segment, and a pinion meshing with the segment to rotate the cutter when in engagement with the fruit, and means for automatically returning the carriage to its elevated position thereafter.

3. In a machine of the kind described, the combination of a frame, means on the frame for supporting the fruit with the flower end uppermost, a guide frame, a cross-head, a rotary spindle carried by the cross-head and guided in the guide frame substantially in line with the flower end of the fruit, a rotary cutter carried by the spindle, a slide bar guided through the guide frame and carrying the cross-head, means for normally holding the cross-head in an elevated position, a handle carried by the slide bar for depressing the same to bring the cutter into engagement with the flower end of the fruit, said cross-head consisting of a segment rigidly connected with the slide bar to enable the handle to rotate the segment, and said spindle having a pinion engaging the segment for rotating the rotary spindle.

4. In a machine of the kind described, the combination of a frame, means for supporting the fruit in a substantially fixed position with its flower end uppermost, a rotary cutter, a cutter spindle carrying the cutter, means for guiding the cutter spindle longitudinally of the fruit's axis to enable the cutter to move into engagement with the flower end of the fruit, a handle mounted for rotation in a plane substantially at right angles to the guiding direction and affording means when moved laterally for advancing the cutter spindle and cutter, and means operated by rotation of the handle on its pivot for rotating the cutter when in engagement with the fruit.

5. In a machine of the kind described, the combination of a frame, means for supporting the fruit in a substantially fixed position with the flower end uppermost, a rotary cutter, a movable carriage carrying the same, means for guiding the carriage longitudinally of the axis of the fruit, a lever connected wtih the carriage so as to swing in a plane substantially at right angles to the direction of guiding, movable bodily to bring the cutter into engagement with the flower end of the fruit, and means actuated by the swinging movement of the lever for rotating the cutter thereafter.

6. In a machine of the kind described, the combination of a frame, means for supporting the fruit in a substantially fixed position with the flower end uppermost, a rotary cutter, a movable carriage carrying the same, means for guiding the carriage longitudinally of the axis of the fruit, a lever connected with the carriage so as to swing in a plane substantially at right angles to the direction of guiding, movable bodily to bring the cutter into engagement with the flower end of the fruit, means actuated by the swinging movement of the lever for rotating the cutter thereafter, and means for withdrawing the carriage thereafter from the fruit.

7. In a fruit peeling machine, the combination of a frame, means for supporting the fruit in a substantially fixed position, a rotary cutter with means for guiding the same to advance on a line substantially coinciding with the axis of the fruit to bring the cutter into contact with the flower end of the fruit, a handle pivotally mounted to swing in a plane substantially at right angles to the guiding direction, movable laterally by hand in the guiding direction for advancing the cutter toward the fruit, and means operated by swinging the handle on its pivot for rotating the cutter thereafter to remove the flower end of the fruit.

HJALMAR GORANSON.
DAVID GORANSON.